United States Patent [19]
Larussa

[11] Patent Number: 6,163,408
[45] Date of Patent: Dec. 19, 2000

[54] COMPACT VISUAL SIMULATION SYSTEM

[76] Inventor: Joseph Larussa, 451 Rutledge Dr., Yorktown, N.Y. 10598

[21] Appl. No.: 09/170,477

[22] Filed: Oct. 13, 1998

[51] Int. Cl.$^7$ .................................................. G02B 27/14
[52] U.S. Cl. ............................................................ 359/630
[58] Field of Search ...................... 359/630, 631, 359/633; 345/7, 8, 9

[56] References Cited

U.S. PATENT DOCUMENTS

| | | | |
|---|---|---|---|
| 3,443,858 | 5/1969 | LaRussa | 359/494 |
| 3,940,203 | 2/1976 | LaRussa | 359/15 |
| 4,163,542 | 8/1979 | LaRussa | 359/15 |
| 4,348,187 | 9/1982 | Dotsko | 434/44 |
| 4,708,438 | 11/1987 | LaRussa | 359/365 |
| 4,761,004 | 8/1988 | Hargabus | 472/63 |
| 4,994,794 | 2/1991 | Price et al. | 345/7 |
| 5,157,503 | 10/1992 | Dugdale | 348/783 |
| 5,278,696 | 1/1994 | Suvada | 359/629 |
| 5,739,955 | 4/1998 | Marshall | 359/631 |
| 5,917,459 | 6/1999 | Son et al. | 345/7 |

*Primary Examiner*—Ricky Mack
*Attorney, Agent, or Firm*—Handal & Morofsky

[57] ABSTRACT

A visual display system having a plurality of optical systems, defining a viewing area whereby an observer views a continuous field of view in both the horizontal and vertical directions. Each of the optical systems collimate light from an image source to provide an image at infinity focus and an second image which is not focused at infinity whereby the image not focused at infinity increases or decreases in size as the observer moves within the defined viewing area.

24 Claims, 9 Drawing Sheets

COMPACT VISUAL SIMULATION SYSTEM

BACKGROUND OF THE INVENTION

1. Field of the Invention

The present invention is directed to a compact high-quality system for simulating real world visual scenes, with the capability of making simulated objects appear at a range of distances extending to infinity.

2. Description of Related Art

So-called infinity display elements, such as the infinity display system available from the assignee of the present application, are well-known structures for presenting, in simulators, images that appear to be at great distances. The principal optical components were invented by me a number of years ago and are described in my U.S. Pat. Nos. 3,443,858, 3,940,203, 4,163,542, and 4,708,438. The disclosures of these patents are incorporated herein by reference. In accordance with the technology disclosed in the aforementioned patents, one may employ a conventional beamspliter mirror physically shaped to be a portion of a sphere, a monochromatic holographic analog of such a spherical mirror, or a full color red-green-blue (or RGB) planar holographic spherical analog beamsplitter element to holographically perform the full color function of a conventional spherical beamnsplitter element.

Generally, such systems operate to simulate a real world scene by presenting a view of a model to an optical array. Typically, in the case of aircraft or marine simulators, the model is a scale model of an aircraft or ship, presented against a background which may be a projected image, reprinted image, a cathode ray tube image, for the like. The background is thus part of the model. Other model elements may be silhouettes, rain, fog, the moon, the sun or any other objects or conditions which one wishes to simulate. The optics in such systems are designed to take light from objects in the model which are meant to be simulated at very great distances and present them to the viewer as collimated light bundles, thus making them appear to be at or near infinity. Likewise, the optics cause light rays of other objects, not meant to the great distances, to depart from the collimated light bundles by an amount proportional to their desired apparent closeness to the observer within the simulator.

SUMMARY OF THE INVENTION

In an attempt to achieve a wide field of view (FOV), I have combined several such infinity focus visual display systems in an array. By way of explanation, field of view refers to the angular subtense of the image presented to a person in the simulator, that is the range of angles of lines of sight emanating to the observer along which the image is simulated.

In principle, a continuous wide field image may also be provided by a spherically arranged array of concave surfaces all of which combine to form a single sphere or portion thereof with the increased field of view desired. For example, this can be implemented with a front element, left element, a right element and a top element. These elements would all be spherical in shape and would lie along the surface of a single sphere.

In such systems, in addition to the angular of the field of view provided by the system, another important characteristic is the size of the pupil, or space, within which the observer can see the simulation. Obviously, a rotatably modest-sized simulator cannot provide a view visible from all points in, for example, a room. The volume of space within which the view may be seen is referred to as the "pupil". Thus, the observer is free to move around within the simulator and still see the intended simulation, provided that both his eyes remain within the pupil. As it is apparent from the above, the pupil should be large enough to accommodate the expected head motions and/or body motions of the person in the simulator, and no larger, because the larger the pupil, the larger the size of the optics required. Nor is this a small point, because the size of the optics required for a simulator to be employed in training pilots, for example, are quite large. Moreover, larger size optics also mean geometrically increased costs.

However, arranging a plurality of mirrors to construct a single spherical section results in a relatively large optical system in many cases, because of the expected range of movement of the observer wherein the radius of curvature of the spherical beamsplitter mirrors must be of a certain minimum value in order to accommodate changes in the position of the observer in the simulator.

If, on the other hand, it is desired to use the simulator in a less upscale application, such as a game simulator, the economic problems involved in providing an appropriate array of large optics, as well as the economics involved in devoting space to housing these optics, make such realistic simulators impractical. In other words, if one wishes to accommodate a wide range of observer movement, larger optics are required, and the costs associated therewith make such large systems impractical for many potential applications.

Such a circular arrangement is prone to have visual anomalies at the regions where the sphere sections come together to transmit the relatively continuous simulated image.

Accordingly in such a design, the overall size of the system is limited by the radius of curvature of the spherical beamsplitter mirrors and thus the advantages of larger radius of curvature are sacrificed in light of size requirements which are dictated by many factors such as cost, portability, manufacturing and shipping.

Thus, there is a need for an optical display system which can provide a 360° horizontal field of view or less and a vertical field of view of 150° or less while having a much smaller total volume than that which can be achieved with an array of concave beamsplitter mirrors arranged as the surface of a sphere.

In order to shrinking or minimize total volume of the optical display system while also talking advantage of larger radius of curvature spherical beamsplitter mirrors so that wider (instantaneous fields of view) pupils can be obtained, a new and inventive system has evolved.

Spherical beamsplitter mirrors normally joined in forming a spherical dome around an observer or observers to provide a continuous field of view either in the horizontal or in the vertical need no longer be joined. Rather, they can be overlapped as will be discussed in detail below. The present invention achieves a larger radius of curvature of the mirrors with the advantages of the larger radius of curvature and the arrangement of a quasi flat-sided display system with a much smaller footprint.

In accordance with the inventive system, a larger radius of curvature provides greater freedom of head motion (a larger pupil) since the head motion or viewing pupil of a Pancake Window® optical display system is as large as the window area and the larger radius of curvature permits the use of larger mirrors to form the window area. In the case of the system on the present invention, this is no longer in unsolvable conflict with the display size minification desired, because the larger mirrors are no longer positioned in a spherical arrangement as will be described and discussed in detail below.

The larger radius of curvature of the system of the present invention provides larger pupil and larger viewing volume permitting greater head motion. In addition, the present invention provides the ability to insert models of any objects to appear at true apparent distances with realistic parallax against a screen image at infinity focus. Such images are also advantageously produced without distortion that would otherwise be evident with larger head motion, in smaller radius of curvature beamsplitter mirrors.

The present invention allows an infinity focus visual display system to be constructed in the form of a cube or a portion thereof, or substantially rectangular, parallelepiped, polygonal or any form of trapezoidal volume desired to be positioned around one or more observers.

More particularly, and in accordance with the present invention, mirrors with a relatively large radius of curvature and forming shapes, where the radius of curvature of the mirror is substantially larger than the distance between the center of the pupil and the mirror, are used. Even though the optical surfaces of the mirrors, which are arrayed in space around an observer, do not together form a single unitary sphere, thus resulting in optical discontinuities where the edges of one mirror meet the edges of another mirror, and in accordance with the present invention, a continuous image is produced. The same is achieved on account of the fact that while each individual mirror in the array produces its image with an optical surface which is dramatically different in its orientation to adjacent portions of other optical surfaces in the system, images are produced at an apparent distance of infinity and accordingly, such produced images mesh with each other as the eye inspects the scene from the end of one mirror to the start of the next adjacent mirror.

In accordance with the preferred embodiment, there is no need to make the surfaces of the mirror match exactly. Instead, member edges slightly overlap, just enough to insure that there is a continuum of mirrors from all points within the pupil.

Alternatively, the same effect can be achieved by cutting the edges of the beamsplitter mirrors so that they butt together exactly and the flat birefringent meets the edges of the butted mirrors at the corners. Referring to FIG. 5A this method is illustrated.

In accordance with one of the embodiments of the invention, simulation is achieved using a model, and other elements which are optical can be added to each other optically the so that all the images go through a single spherical mirror. Such optical addition may be performed with more than one mirror in the simulator, in accordance with the present invention.

It is also contemplated in accordance with the invention that flat holographic, as well as classical shaped optical elements may be used.

The inventive system also contemplates the positioning of relatively flat models and pictorial representations at angles, other than the perpendicular, with respect to the line of sight of the observer looking at the center of the model, in order to achieve desired dimensional depth perceptions.

BRIEF DESCRIPTION OF THE DRAWINGS

One way of carrying out the invention is described in detail below with reference to the drawings which illustrate one or more specific embodiments of the invention and in which.

DETAILED DESCRIPTION OF THE PREFERRED EMBODIMENT

Figure 1:
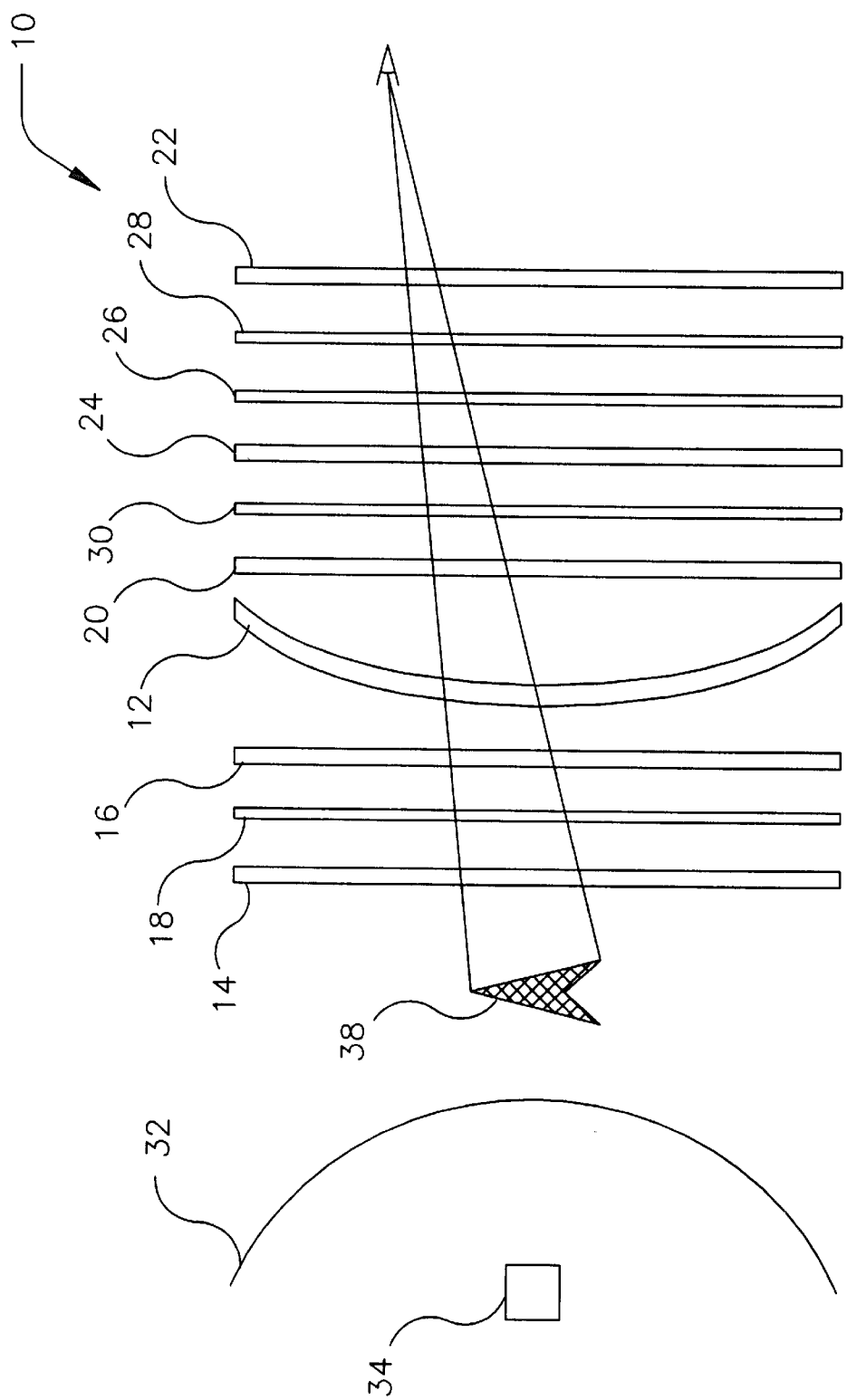
FIG. 1 is an exploded view of an optical display used in accordance with the present invention.

Turning now to FIG. 1 an exploded view of an optical display system 10 constructed in accordance with the present invention is illustrated. As alluded to above, the optical components employed in this embodiment take the form of the system described in my U.S. Pat. Nos. 3,443,858, 3,940,203, 4,163,542 and 4,708,438, the disclosures of which are herein incorporated by reference.

Optical system 10 comprises a spherical mirror beamsplitter 12. A pair of end plates 14 and 16 which are positioned around a polarizer 18 on the convex side of spherical mirror 12. End plates 14 and 16 have the optical characteristic of rigidizing the polarizer 18 and decreasing any unwanted light reflections from both the screen 32 and assembly of spherical mirror 12, and plate 20 and flat beamsplitter 30. These reflections are avoided by high efficiency anti-reflection coatings.

Accordingly, the polarizer assembly (14, 18, 16) performs the function of polarizing the image light from screen 32 that projects into the remainder of optical system 10.

On the opposite, concave side of spherical mirror 12, a second pair of end plates 20 and 22, whose optical characteristics and structure is substantially identical to the optical characteristics and structure of end plates 14 and 16, are positioned in facing spaced relationship to each other to define a space between them. A plane beamsplitter 24 is contained in that space between end plates 20 and 22. Positioned between end plate 22 and plane beamsplitter 24 is a quarter wave plate 26 and a polarizer 28. Polarizer 28 is closer to end plate 22, while quarter wave plate 26 is positioned adjacent plane beamsplitter 24. Another quarter wave plate 30 is positioned between plane beamsplitter 24 and end plate 20.

The combination of a plane polarizer 18, spherical beam-splitting mirror 12, quarter wave plate 30, beam splitting plane mirror 24, quarter wave plate 26 and polarizer 30 described in conjunction with the above referenced patents causes the formation of a virtual image at or near the principle focus of mirror 12. The image is then imaged in turn at infinity by mirror 12.

A transmission screen 32 having a radius of curvature one half the radius of curvature of spherical mirror 12 is positioned with its convex side facing the convex side of mirror 12. Accordingly, the image thereof produced by plane beamsplitter 10 may coincide with the curved focal surface of spherical beam splitter mirror 12.

A projector 34 (not shown) is used to project an image on the rear side of transmission screen 32 which, in turn, is visible from the front of screen 32 and produces light which passes through optical display system 10. The image on screen 32 is at infinity when viewed by an observer, because the light reflected off of flat beamsplitter 24 into the concave side of the spherical beamsplitter 12 is reflected towards the observer in collimated fashion to appear at infinity.

The remaining light or bleed-through passing through the flat beamsplitter is not collimated and is extinguished by polarizer 28 so that the observer sees only the collimated image.

Image comprises a foreground image closer than infinity generated by a model 38. A real world model 38 is placed between screen 32 and end plate 14 and is seen by the observer at the true distance from the observer because the model is not extinguished by the polarizer 28. For this reason there is parallax between the infinity screen image and the model providing the very important visual cue of parallax between separated objects.

In the preferred embodiment, model 38 is of an object which increases its size as the obsever moves closer to the optical system. Size variations of the image of model 38 may also be effected by moving the model itself with respect to the optical system. Also, as the model is moved closer to the screen the apparent distance approaches infinity.

Optical display system 10 can receive multiple inputs where a beam splitter is used to project one or more objects through optical display system 10 and by varying the individual object distances, the objects will appear at varying distances each with parallax due to their separation. Optical display system 10 will display true virtual images that are three dimensional. When three dimensional models are used.

In accordance with the preferred embodiment of the present invention, it is anticipated that the optical display system 10 will in many cases be made in whole or in part by sandwiched holographic members. While holographic members generally focus light at a single wavelength, full color is achievable in a multi-layered holographic sandwich of the type sold under the trademark PANCAKE WINDOW by the Farrand Optical Company Inc. previously of Valhalla, N.Y. In accordance with the preferred embodiment of the invention, such PANCAKE WINDOW may be made to incorporate three separate holographic mirrors each tuned to three different colors, namely red, blue and green, in order to achieve a full color presentation.

Figure 2:
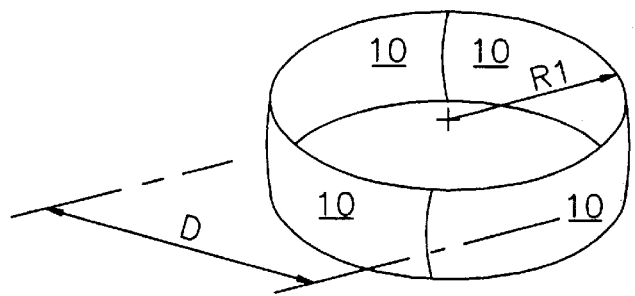
FIG. 2 is a perspective view of optical systems circularly arranged in accordance.

Turning now to FIG. 2, a plurality of optical display systems 10 are circularly arranged. Prior to the conception of the present invention, the configuration of circularly arranged mirrors, including the joints was considered the only possible way of providing a continuous wide field image.

The diameter D of the sphere illustrated in FIG. 2 is limited by R1 the radius of curvature for spherical beam splitters 12 of optical display systems 10.

Figure 3:
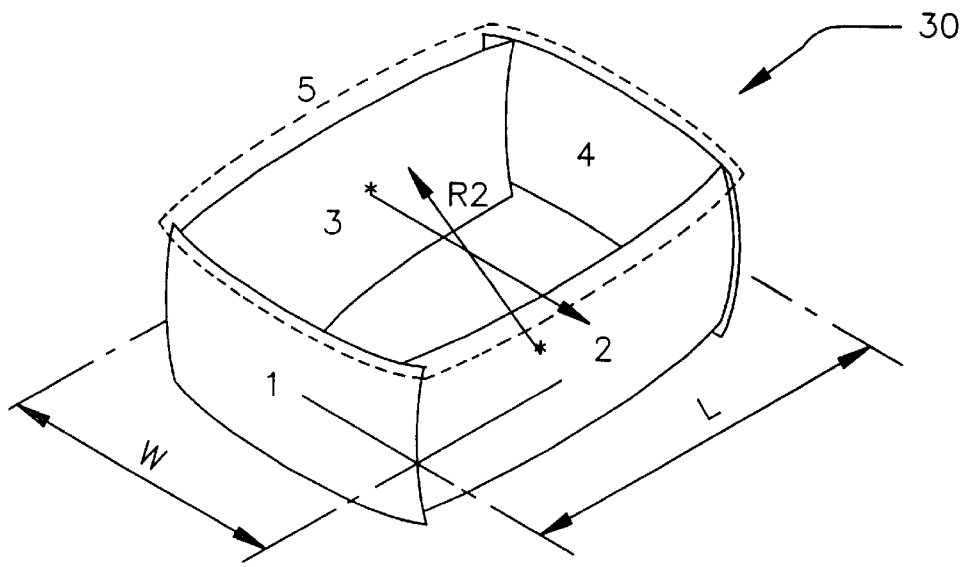
FIG. 3 is a perspective view illustrating an optical system enclosure constructed in accordance with the present invention.

Turning now to FIG. 3, a visual display system 30 constructed in accordance with the present invention is illustrated. Here, a plurality of optical display systems 10 are arranged in a cube. In accordance with the present invention, the arrangement is not limited to a cube, optical display systems 10 can be rectangularly arranged, or in any parllelepipped configuration or any form of trapezoidal volume or any other similar arrangement.

Referring now in particular to FIGS. 2 and 3, the configuration of visual display system 30 results in an overall reduction in volumetric size and weight. In addition to the reduction in size and weight, optical display systems 10 in FIG. 3 have a larger radius of curvature and are "flatter". Whereas, the radius of curvature R1 (FIG. 2), is considerably smaller than radius of curvature R2 (FIG. 3) of spherical mirrors 12 of systems 10 arranged in a cubical or trapezoidal arrangement.

This larger radius R2 and larger spherical mirror provides a larger exit pupil and accordingly much greater head motion is allowed internally of visual display system 30. The large radius of curvature R2 also provides a flatter outline resulting in either width W or length L (FIG. 3) occupying a smaller size externally than the assembly of FIG. 2. Visual display system 30 also provides a larger internal volume which allows more freedom of motion internally or a further reduction in overall size is possible.

In the preferred embodiment, the radius of curvature for each spherical beam splitter mirror 12 is equal to each other. Accordingly, the light collimated by each system 10 creates a continuous field of view focused at infinity. Thus, as an observers eyes move from system to system the image is continuous and all lines that are straight lines crossing in adjacent systems remain straight and join as straight lines.

Figure 4:
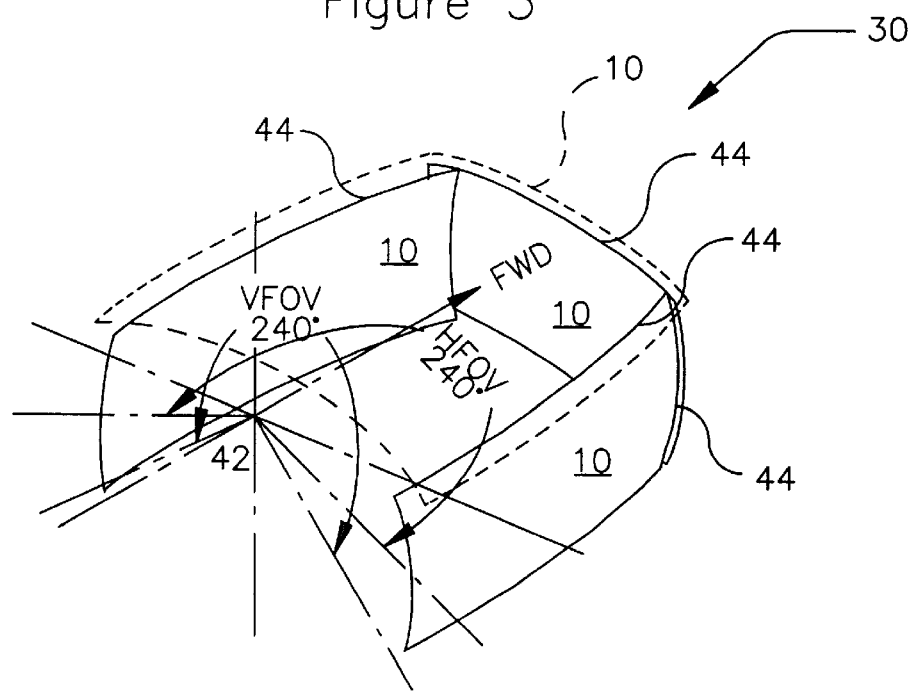
FIG. 4 is a perspective view of illustrating a partial optical system enclosure constructed in accordance with the present invention.

Turning now to FIG. 4, visual display system 30, constructed in accordance with the present invention has four optical display systems 10 arranged to provide 240° horizontal and 240° vertical fields of view in a trapezoidal format aimed to provide a continuous field of view from a viewing area 42.

One of the numerous applications for this configuration would be a field of view perspective from a single seat aircraft or helicopter simulator.

It is significant that with this inventive display illustrated in FIGS. 3 and 4, all fields of view both vertical and horizontal are contiguous because of their infinity projection with overlap fields at the joints 44.

The exit pupil of optical display systems 10 is as large as and as uniform in brightness as the aperture of the window with a screen of the proper gain (preferably not exceeding a gain of between 5 and 7). In addition, if the viewing position from any large distance decreases and the observer approaches optical display systems 10 the field of view increases or widens just as it does when one approaches a real window or when lateral head motion increases. In order to provide the required increase in width of field for any such application, the size of screen 32 must be increased to accommodate the observer's closest approach.

Figure 5A:
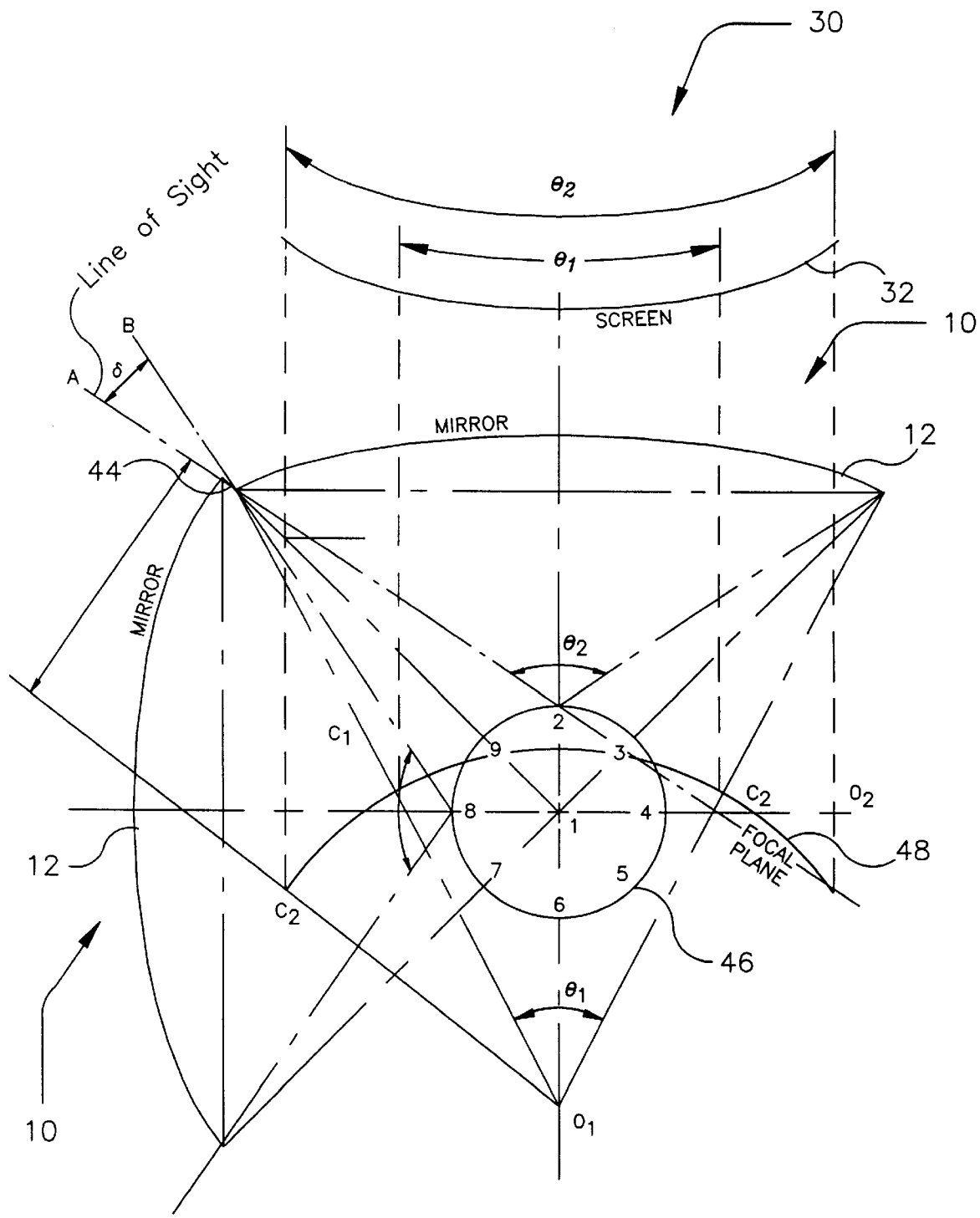
FIGS. 5a and 5b are top views of an optical system enclosure constructed in accordance with the present invention.

To illustrate this, reference is now made to FIG. 5, here a pair of optical display systems 10 are positioned orthogonal to each other and have a common joint 44. A pupil 46 having a series of observer positions 1–9 which are depicted, for purposes of explanation. It is contemplated that an observer may occupy any position within pupil 46 of the inventive visual display system 30 providing a continuous field of view.

From the center of curvature (OI), the field-of-view (FOV) available from mirror edge to mirror edge of mirror 12 of optical display system 10 is the angle θ1. The size of screen 32 required for this FOV is C1-C2 the diameter at the focal plane of mirror 12.

The focal plane 48 of spherical mirror 12 is located at a distance of ½ the radius of curvature of the mirror from its center of curvature (OI). If the observer moves towards mirror 12 to position 2 of pupil 46, the available field of view from edge to edge of mirror 12 of optical display system 10 increases to θ2 and the size of screen 32 required for the θ2 field of view (FOV) is found by bringing line-of-sight (LOS) 2-A down in parallel fashion until it intersects the focal surface at C2. The screen diameter required is then defined by C2-C3.

As illustrated, the FOV for the upper mirror, will always be less at any point other than position 2. Similarly, with adjoining and overlapping optical display system 10, or the left mirror, the maximum FOV θ3, would be at position 8.

Figure 5B:
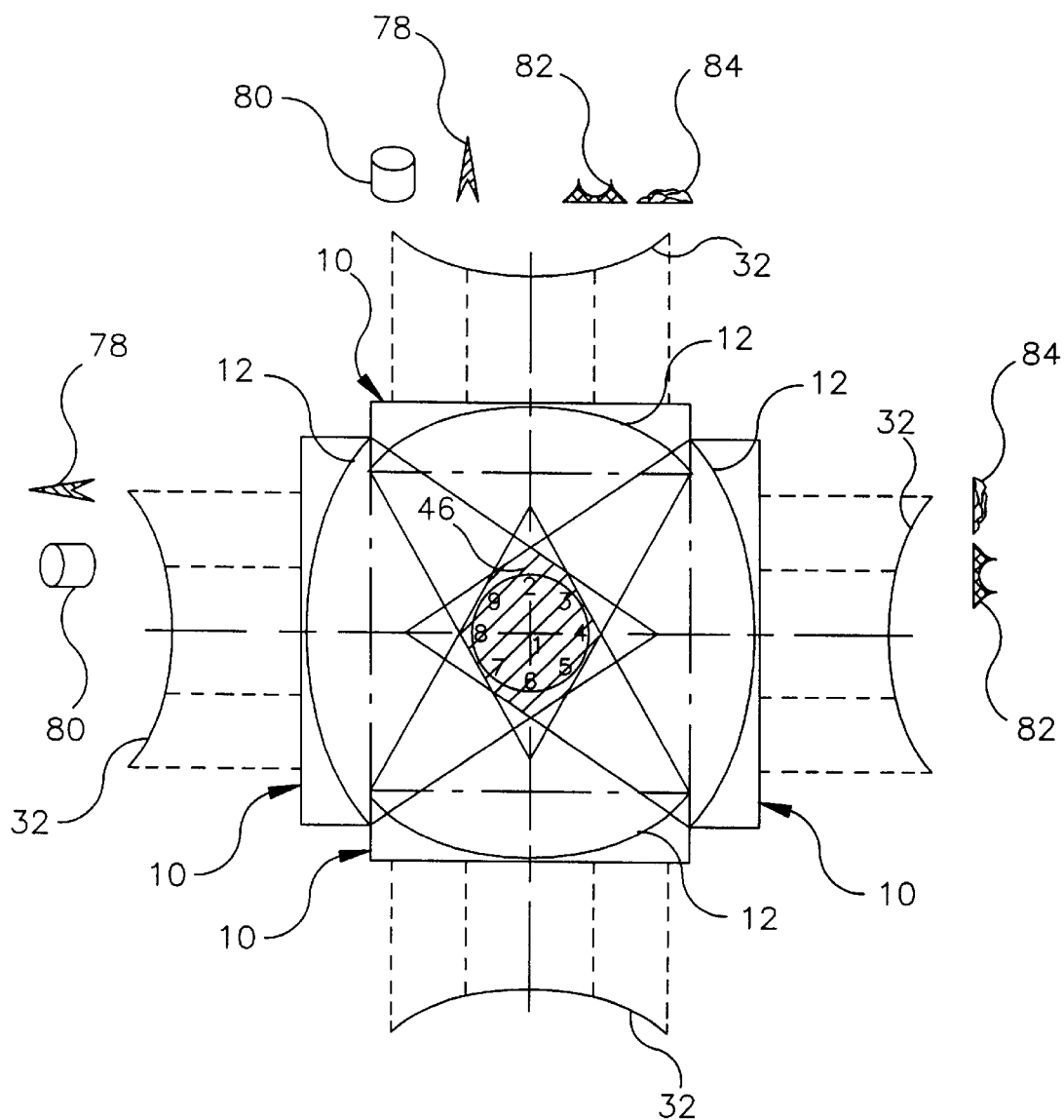

Referring now to FIG. 5b, a visual display system 40 comprising four optical display systems 10 is illustrated. Here pupil 46 (shaded area) is defined by the overlapping fields of view, as defined by the center of curvature of mirrors 12 of each of the systems 10. Accordingly, an observer will view a continuous field of view generated by systems 10 from any point within pupil 46. Moreover, even if one of the observers eyes is outside the area defined by pupil 46 while the other is within the area defined by pupil 46, the observer will still view a continuous field of view.

Turning back now to FIG. 5a, it is noted for example that the fields of view θ1 and θ3 overlap each other by angle γ.

In fact, this is true for all adjoining mirrors 12 or in total optical display systems 10 from the two shown in FIG. 5 to three, four or five encircling an observer or observers so that the observer or observers will view a continuous horizontal FOV without any distortion with head motion even though the mirrors 12 of the optical display systems 10 do not form a continuous spherical surface.

This is true because each mirror 12 of the optical display systems 10 collimates or projects each point fed into the individual mirror 12 to infinity focus and adjoining mirrors 12 that are not continuous project adjoining images to infinity focus where all images must join one another.

Similarly, the continuous image characteristic also pertains to joint 44 of overlapping images from the horizontally arranged mirrors to the overhead mirror (see the dashed lines) in FIGS. 3 and 4.

The present invention, which, as noted above, has optical systems 10 overlapping, although not limited to those as shown in FIGS. 3, 4, 5, 6 and 7.

In fact, if the mirrors are butted together at the edges as shown in FIGS. 6, 7, 7a and 7b there will still be a lune visible as shown. This lune however can be reduced by adjusting the angle between adjacent mirrors.

Figure 7:
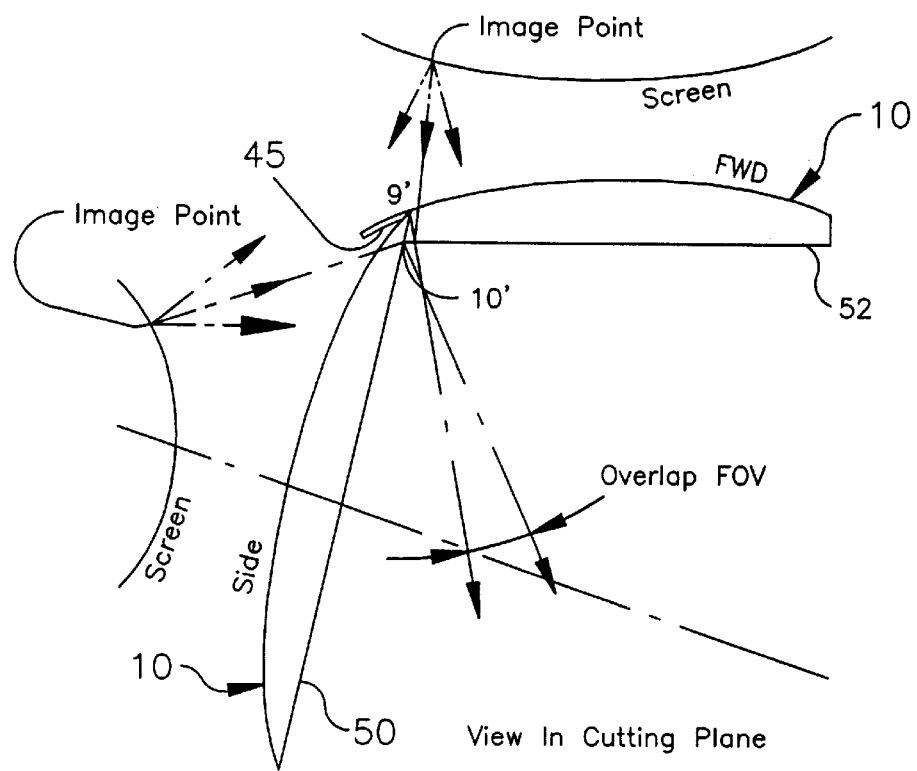
FIG. 7 is a view along lines 7—7 of FIG. 6.
Figure 7A:
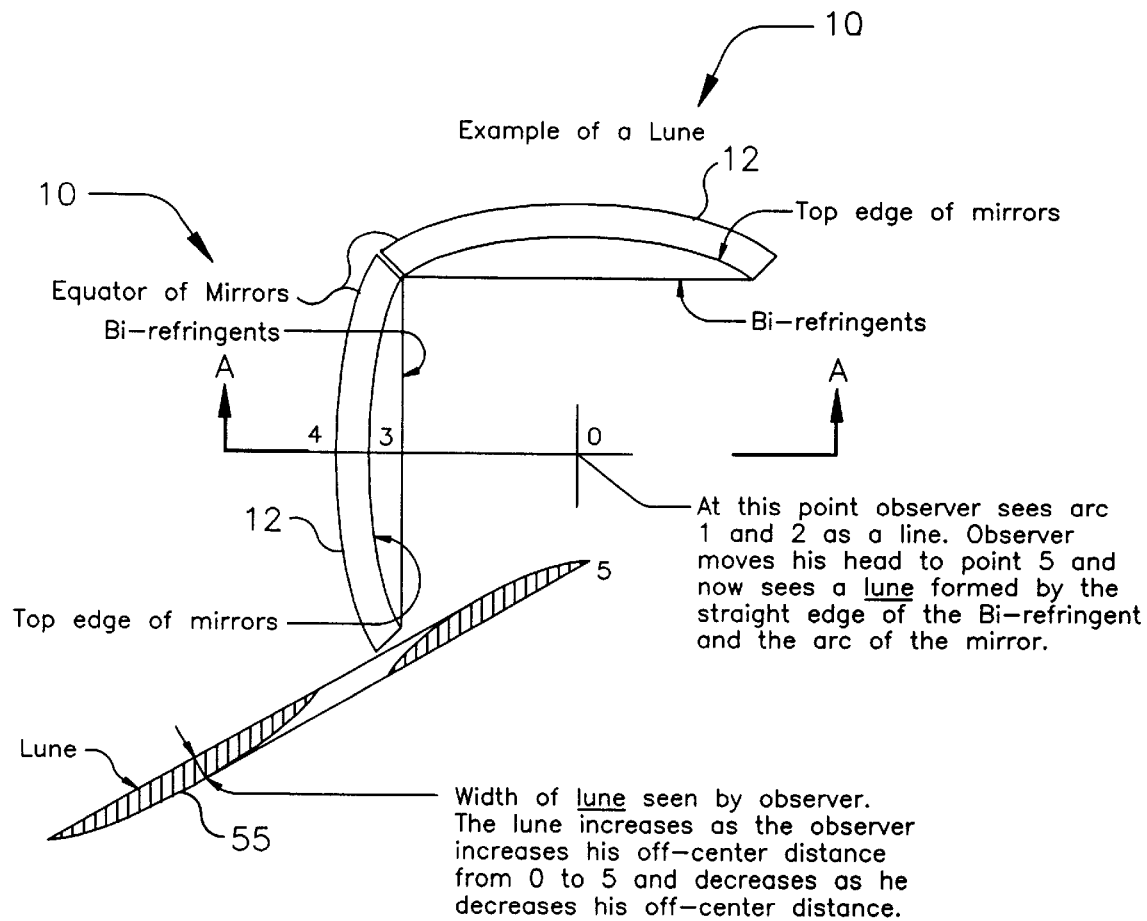
FIGS. 7a and 7b is a top plane view of a partial optical enclosure constructed in accordance with the present invention.
Figure 7B:
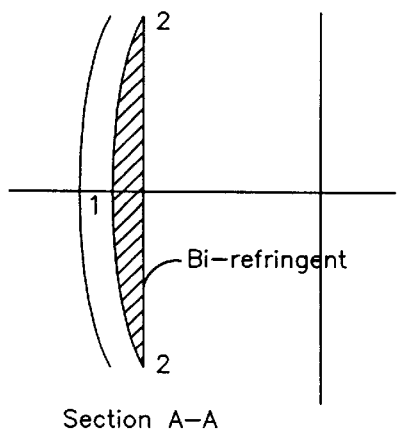

Referring now to FIGS. 7a and 7b, an example of a lune is illustrated. FIG. 7a shows a pair of optical display systems 10. From an observer position 0 an observer sees arc 1-2 as a line. As the observer moves towards point 5 he will now see a lune 55 formed by the straight edge of the birefringent element (as described below) and the arc of mirror 12.

The size of the lune increases as an observer increases his off—center distance, from position 0 to 5. Lune 55 decreases in size as the observer decreases his off—center distance.

Overlapping of systems 10, reduces a reflective lune as compared to the system depicted in FIG. 2.

This is because the reflections of the mirror seam of the display illustrated in FIG. 2 and the joint of the butted bi-refringents are evident to an observer as lunes formed by straight and lunar shaped edges that reflect from the spherical mirrors.

A lune is a wedge shaped slice of a sphere, a crescent shape similar to a ¼ moon, ⅕ moon, etc.

Figure 6:
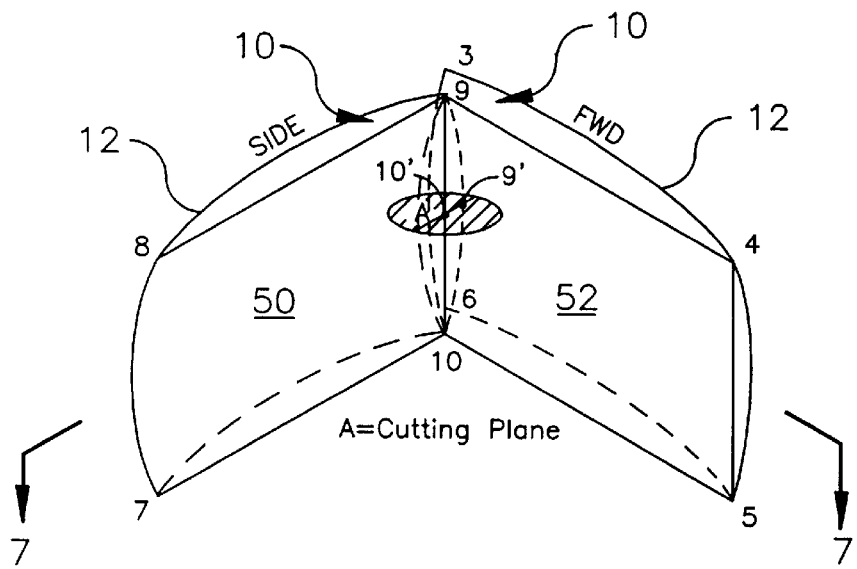
FIG. 6 is a perspective view of a partial optical system enclosure constructed in accordance with the present invention.

In FIG. 6, reflection of these lunes is also formed as in the FIG. 2 display but to a very much lesser degree because of the overlap design of the present invention.

FIG. 7 illustrates a top view of the overlapping mirror arrangement as viewed along lines 7—7 in the horizontal cutting plane of FIG. 6.

In FIG. 7, a flat bi-refringent element 50 comprising: end plate 20; quarter wave plate 30; beam splitting plane mirror 24; quarter wave plate 26; polarizer 28; and end plate 22. The aforementioned elements are cemented together to provide bi-refringent element 50 which is positioned contiguous to mirror 12 of system 10 so that the edges of bi-refringent element 50 are tangent to the inside curvature of an adjoining mirror 12.

A second bi-refringent element 52, having the optical characteristic of bi-refringent 50 is positioned on the surface of mirror 12 and is cut to meet with the flat surface of the bi-refringent element 50 at line 10'. Image points off the screens project into the bi-refringent elements so that they are reflected back to the spherical beamsplitter mirrors 12 and collimated. The collimated image points' rays then pass through the respective bi-refringents to the observer.

Note that the edges of the mirror fields of view overlap to allow a continuous image across the overlapped images. The inner edge of the forward mirror is painted non-reflective black at an overlap area 45 to prevent any rays to pass through the two birefringents (50 to 52) causing a double image.

In FIG. 7, one mirror is shown overlapping the other mirror however, the arrangement can be reversed if so desired.

Another advantage of display system 30 is that any object or multiple objects that in reality are closer to the observer than the infinity projection or at a variable distance from the observer can be simulated at exactly the real distance, thereby providing the proper parallax between objects and the distant background.

Figure 9:
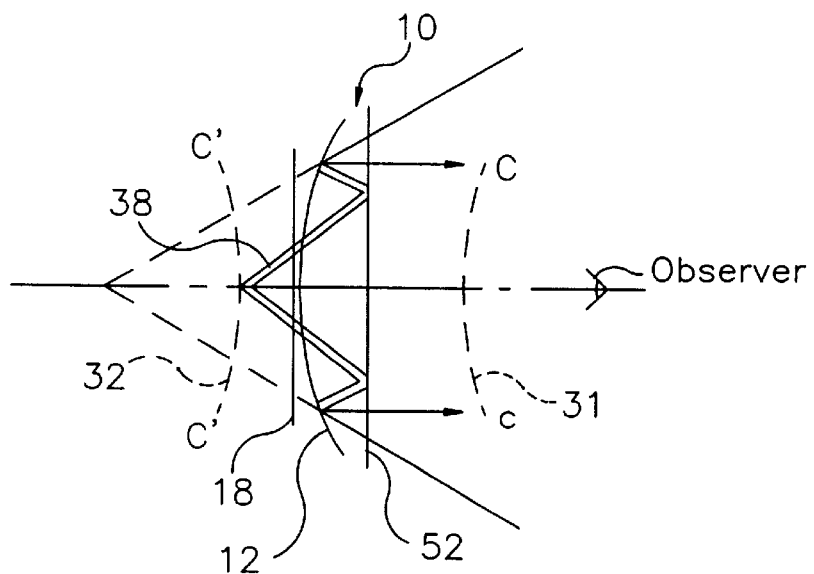
FIG. 9 illustrates images generated with the optical systems used in the present invention.

This is achieved by inserting a model or models 38 of objects to be displayed by optical display systems 10. Referring now to FIG. 9, model 38 is inserted in the space between screen 32, which is seen at infinity focus and polarizer 18.

The closer model 38 is to screen 32 the greater the apparent distance of the model until the model is moved up to the screen where it appears to be at infinity focus. This model insertion space between the rear of the polarizer 18 and screen 32 which has been termed "foreshortened optical space", because longitudinal distances in this space are greatly magnified.

For this reason any model such as windows, head-up displays, etc., must be greatly reduced in longitudinal size. Lateral magnification also exists but to a lesser extent. This characteristic must also be considered and the size of the model must be calculated.

Figure 11:
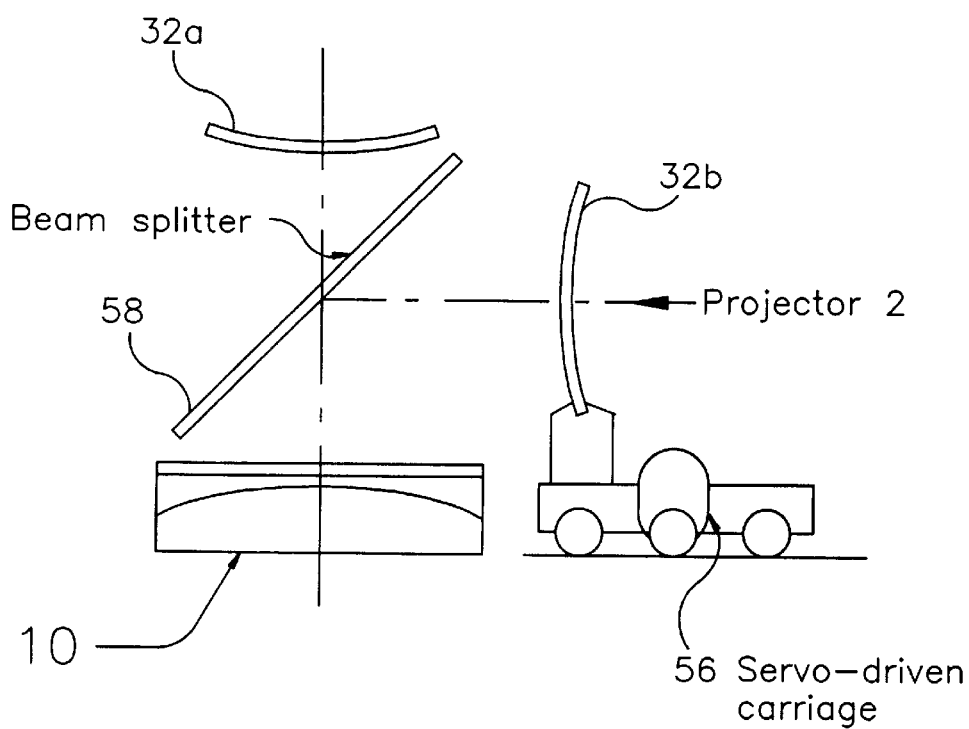
FIG. 11 illustrates a dual image input for the present invention.

Alternatively and referring now to FIG. 11, the same variable distance and parallactic effect is attainable by combining images from a pair of screens 32a and 32b, one at infinity focus and the other at any desired distance.

The distance of screen 32b can be made variable by driving screen 32b in or out with respect to the stationary screen 32a as shown in Figure 11. Such movement is facilitated by a drive mechanism 56 such as a servo driven mechanical carriage or the equivalent. Both screen images are combined for any one optical display system 10 by a beamsplitter 58. Then in accordance with the present invention multiple display systems 10 are combined for a visual display system 40.

It should be noted that the infinity image of screen 32a does not magnify with observer motion towards the image, because the image is truly at infinity focus however, objects inserted in foreshortened optical space as defined and illustrated in FIG. 9 will vary in size with observer motion in or out, just as they would in the real world, since these objects are actually at true apparent distances closer than infinity focus. Since the lateral magnification may not provide the true size with the approaching distance as the longitudinal magnification does because of the optical parameters used it may be necessary to also provide differential magnification by the projector being used.

This feature cannot be achieved with any other type of display system other than an infinity display system with a high degree of accuracy such as optical display system 10.

Figure 8:
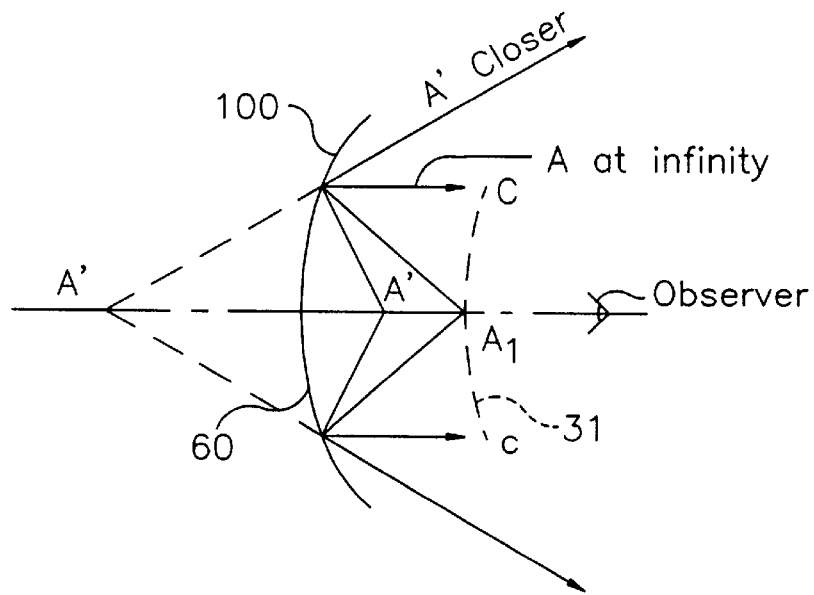
FIG. 8 illustrates images generated with a spherical mirror.

Accordingly, this system is capable of displaying true 3D between objects in the field of view. FIG. 8 illustrates how apparent distance varies with an ordinary first surface spherical mirror 60. FIG. 9 illustrates the same result with an optical display system 10 where the Bi-refringent 52 allows a screen 32 to be positioned at the rear of the spherical beamsplitter mirror 12, where the object does not interfere with the observer's mirror.

The resulting reflections off of mirror 12 can be compared to those demonstrated in FIG. 8 showing the optical similarity of operation between the optical display system 10 and the front surface of mirror 60.

However, in FIG. 8 the objects are located between the observer and the collimating mirror 60 as is a screen 31, making this sketch useful only for describing a similarity.

In any other way it is totally unworkable and only the optical display system 10 of FIG. 9 can be used as a wide-field on-axis infinity display.

At this point, two examples of the numerous applications of the present invention can be described and claimed for the unique use of the optical display system 10 "foreshortened optical space".

Figure 10:
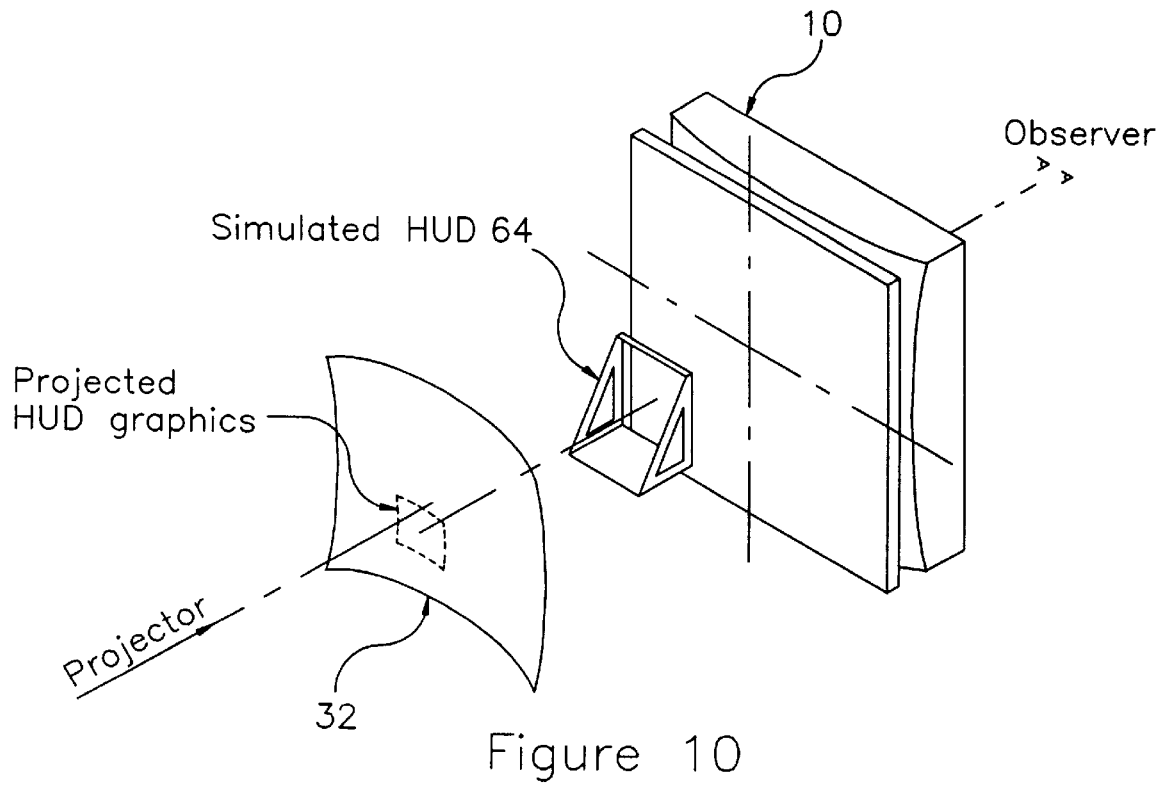
FIG. 10 is a perspective view illustrating one contemplated dual input embodiment of the present invention.

First, an aircraft or other vehicular device using a Head-Up Display (HUD) which is located in foreshortened optical space as shown in FIG. 10.

For example, an image produced by screen 32, including any graphics viewed through the frame of a heads up display HUD 64, are all seen at infinity focus as it should be, but the graphics for HUD 64 are viewed at infinity focus within the frame of HUD 64, which is at the true apparent distance, since the frame is not projected to infinity focus. In this manner, true parallax exists with observer head motion adding real world illusion to the overall view. Of course, the HUD graphics are within the HUD frame with sufficient clearance so that they are not visible outside the frame with head motion.

Figure 12:
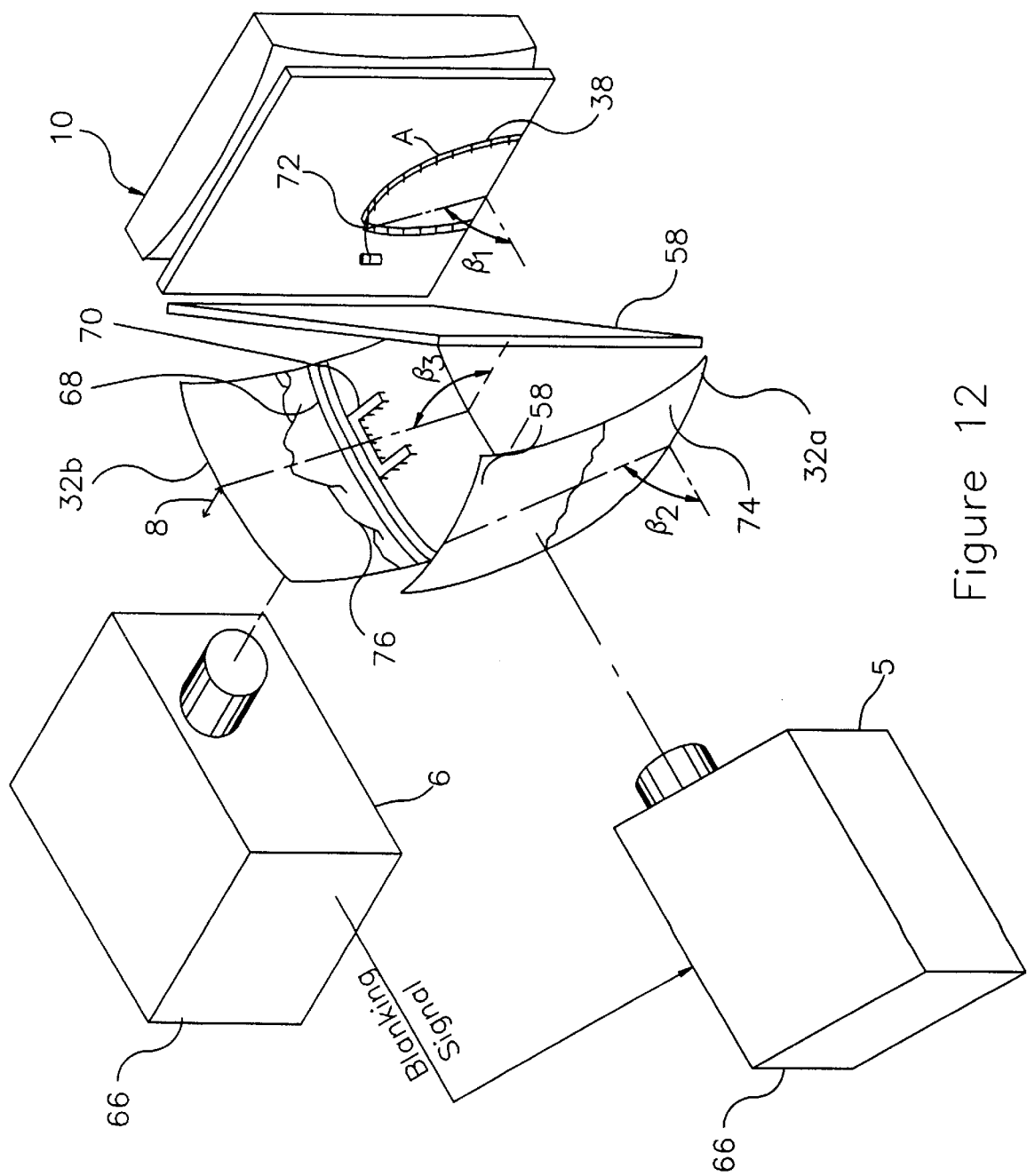
FIG. 12 is a persepective view illustrating another contemplated embodiment of the present invention.

A second example is, a docking simulation for vehicles such as spacecraft, land vehicles and marine vehicles, such as the one illustrated in FIG. 12. Here two screens 32a and 32b provide input to the image. Generally, in docking simulation of marine or land vehicles, at least one of the screens inputting images should be servo-driven with corresponding image magnification for a realistic 3D simulation as shown in FIGS. 11 and 12.

For instance, in a docking simulation, as a ship either space, air, land or sea advances towards a dock, the projected scene is generated by an image generator 66 or a plurality of image generators 66. In the preferred embodiment image generators 66 are CRT's, or video projectors.

As illustrated in FIG. 12, an approaching coast 68 and dock 70 must grow in magnification and in aspect changes in accordance with the varying distance, as evidenced by the view of a ships prow 72 which, is modeled in foreshortened 3D and is stationarily fixed to the front bridge windows. This dynamic visual display will provide the necessary visual cues (parallax, relative motion and variable magnification as well as a dynamic water surface).

To improve the visual display, ships' prow 72 should be tilted to an angle B1 to simulate an increasing distance to its end as shown in FIG. 12. In the preferred embodiment angle B1 is a suitable number of degrees that can be calculated. Similarly, tilting screen 32a through an angle B2 will show a receding water surface 74 from below prow 72 to infinity together with a horizon background 76 by tilting screen 32b which may also project dock 70.

In the preferred embodiment angle, B2 is also calculated to be a suitable number of degrees.

Movement of screen 32b is facilitated through the use of a servo-driven mechanism, or the equivalent. The movement of screen 32b in from an infinity focus position together with corresponding magnification of the same simulates a realistic approach to docking.

The upper portion of the horizon 76 will remain at approximate infinity because of the tilt of B3 of screen 32b. In the preferred embodiment angle B3 is a calculated number of degrees. The composite dynamic scene from screens 32a and 32b will provide 3D realism.

Blanking of the seascape or receding water surface 74 in screen 32a will be required to superpose the moving and varying magnification of the images of screen 32b having an angle of B3 onto the image of screen 32a.

The seascape image of screen 32a will also be made to move and to vary in magnification of waves or caps in accordance with the approach to the dock.

Turning back now to FIG. 5b the overlap of the images projected at infinity by screens 32 is illustrated. Here an image of a tower 78, an oil tank 80, a suspension bridge 82 and a mountain scene 84 is projected at infinity by the upper screen 32. Overlap of the adjoining screens is illustrated by projector positioning of tower 78 and oil tank 80 to the right of left screen 32 and tower 78 and oil tank so in reverse order to the right of upper screen 32.

While illustrative embodiments of the invention have been described above, it is, of course, understood that various modifications will be apparent to those of ordinary skill in the art. Many such modifications are contemplated as being within the spirit and scope of the invention.

What is claimed is:

1. A visual display system comprising:
   a) a plurality of optical systems, configured dimensioned and positioned to define a viewing area, said optical systems each collimating light from an image source;
   b) an image for viewing by an observer in said viewing area, said image comprising:
      i) a first image, being generated by each of said optical systems or partially by one or more of said optical systems, said first image being focused at infinity;

ii) a second image which is not focused at infinity and said second images increases or decreases in size as the observer moves within said viewing area.

2. A visual display system as in claim 1, wherein said optics comprises:
   a) a first polarizer;
   b) a beam-splitting spherical mirror convex towards said first polarizer;
   c) a first quarter wave plate disposed on the concave side of said spherical mirror, said first quarter wave plate having its fast and slow axis disposed at substantially 45 degrees to the plane of polarization of said first polarizer;
   d) a second beam splitting mirror disposed on the side of said first quarter wave plate remote from said spherical mirror;
   e) a second quarter wave plate positioned on the side of said second beam splitting mirror remote from said first quarter wave plate, said second quarter wave plate having its fast and slow axes oriented with respect to the corresponding axes of said first quarter wave plate at angles equal to a first substantially integral multiple of 90 degrees;
   f) a second polarizer disposed on the side of said second quarter wave plate remote from said second beam splitting mirror, said second polarizer having its plane of polarization oriented to the plane of polarization of said first polarizer at an angle equal to a substantial integral multiple of 90 degrees, one of said multiples being even and the other odd; and
   g) a diffusing screen disposed on the side of said first polarizer remote from said beam splitting spherical mirror at a distance from said second beam splitting mirror such that the virtual image of said screen in said second beam splitting mirror is adjacent to the focal surface of said first mirror.

3. A visual display system as in claim 2, wherein said optics further comprise:
   h) a first pair of plates positioned on either side of said first polarizer; and
   i) a second pair of end plates wherein one of said second pair of end plates is positioned on the side of said first quarter wave plate facing the concave side of said spherical mirror and the other is positioned on the side of said second polarizer remote from said second quarter wave plate
whereby said end plates have a broad band anti-reflection coating.

4. A visual display system for presenting a virtual image, as in claim 3, wherein said multi layer sandwich of optical elements including holographic optical elements comprise a pair of oppositely polarized and circularly polarizing members.

5. A visual display system for presenting a virtual image, as in claim 3, wherein said optics comprise a multi layer sandwich of optical elements including holographic optical elements.

6. A visual display system, comprising;
   a) a viewing area;
   b) a plurality optical systems for producing an image, said optical systems each having the optical characteristics of a spherical beam splitting mirror and are arranged in a non-spherical arrangement with respect to the radius of curvature of said spherical beamsplitter mirror characteristics;
   c) a plurality of overlap points being defined by said non-spherical arrangement of said optical systems;
whereby said visual display system provides a continuous field of view of said image across said overlap points as an observer moves within said viewing area.

7. A visual display system as in claim 6, wherein said optics comprises:
   a) a first polarizer;
   b) a beam-splitting spherical mirror convex towards said first polarizer;
   c) a first quarter wave plate disposed on the concave side of said spherical mirror, said first quarter wave plate having its fast and slow axis disposed at substantially 45 degrees to the plane of polarization of said first polarizer;
   d) a second beam splitting mirror disposed on the side of said first quarter wave plate remote from said spherical mirror;
   e) a second quarter wave plate positioned on the side of said second beam splitting mirror remote from said first quarter wave plate, said second quarter wave plate having its fast and slow axes oriented with respect to the corresponding axes of said first quarter wave plate at angles equal to a first substantially integral multiple of 90 degrees;
   f) a second polarizer disposed on the side of said second quarter wave plate remote from said second beam splitting mirror, said second polarizer having its plane of polarization oriented to the plane of polarization of said first polarizer at an angle equal to a substantial integral multiple of 90 degrees, one of said multiples being even and the other odd; and
   g) a diffusing screen disposed on the side of said first polarizer remote from said beam splitting spherical mirror at a distance from said second beam splitting mirror such that the virtual image of said screen in said second beam splitting mirror is adjacent to the focal surface of said first mirror.

8. A visual display system, as in claim 7, wherein said second beam splitting plane mirror providing for separate inputs of said second image and said first image, said first image being a backdrop for said second image and, said backdrop and said second image having a variable distance from the end of said end plate remote from said first polarizer thereby varying the size and position of said second image with respect to said first image.

9. A visual display system as in claim 7, wherein said optics further comprise:
   h) a first pair of plates positioned on either side of said first polarizer; and
   i) a second pair of end plates wherein one of said second pair of end plates is positioned on the side of said first quarter wave plate facing the concave side of said spherical mirror and the other is positioned on the side of said second polarizer remote from said second quarter wave plate
whereby said end plates have a broad band anti-reflection coating.

10. A visual display system, as in claim 9, wherein said second image is generated by a frame for a Heads Up Display (HUD), said frame being positioned between said screen and said end plate.

11. A visual display system for presenting a virtual image, as in claim 9, wherein said optics comprise a multi layer sandwich of optical elements including holographic optical elements.

12. A visual display system, as in claim 9, wherein said first image is generated by said screen and said second image is generated by a model positioned between said screen and said end plate.

13. A visual display system, as in claim 12, wherein said model is mechanically driven to vary its position and accordingly, the size of said second image as it is viewed by an observer.

14. A visual display system, as in claim 9, wherein said optics further comprise:
   j) a second screen for providing an image to be viewed; and
   k) a third beam splitter mirror positioned on the side of said first polarizer remote from said convex side of said beam splitting spherical mirror, said third beam splitter position to receive and combine image input from said first and second screens.

15. A visual display system, as in claim 14, wherein said second screen is mechanically driven to vary its position and accordingly, the size of said input from said second screen as it is viewed by an observer.

16. A device for simulating a visual feature, comprising:
   (a) a first optical member;
   (b) a first model positioned behind said first optical member, said first model comprising a first element representing a visual feature, said first optical member forming a first simulated image of said visual feature at a first set of points in a first spatial volume within a viewing space;
   (c) a second optical member, said second optical member being positioned at an angle with respect to said first optical member; and
   (d) a second model positioned behind said second optical member, said second model comprising a second element representing said visual feature, said second optical member forming a second simulated image of said visual feature at a second set of points in a second spatial volume within said viewing space, said first and second simulated images being substantially in registration with each other, and the intersections of said first and second volumes defining a pupil.

17. A device as in claim 16, wherein said first optical member is an infinity display device.

18. A device as is claim 17 wherein said second optical member is an infinity display device.

19. A device as in claim 16 further comprising:
   (e) third optical member, said second optical member being positioned at an angle with respect to said first and second optical members; and
   (f) a third model positioned behind said third optical members, said third model comprising a third element representing a visual feature common with said second model, said third optic forming a third simulated image of said visual feature.

20. A device for providing images of a simulated scene as in claim 16 wherein a person positioned behind said first and second optical members can see said simulated image of said visual feature with both eyes, one of said eyes seeing said visual feature to said first optical member, and the other of said eyes seeing said feature through said second optical member, the image produced by said first and second optical member appearing to be the image that would bee seen by each of said eyes if the scene was real.

21. A visual display system as in claim 16, wherein said optical members comprise:
   a) a first polarizer;
   b) a first focusing beam-splitting spherical mirror convex towards said first polarizer;
   c) a first quarter wave plate disposed on the concave side of said spherical mirror, said first quarter wave plate having its fast and slow axis disposed at substantially 45 degrees to the plane of polarization of said first polarizer;
   d) a second beam splitting mirror disposed on the side of said first quarter wave plate remote from said spherical mirror;
   e) a second quarter wave plate positioned on the side of said second beam splitting mirror remote from said first quarter wave plate, said second quarter wave plate having its fast and slow axes oriented with respect to the corresponding axes of said first quarter wave plate at a angle substantially equal to 90 degrees; and
   f) a second polarizer disposed on the side of said second quarter wave plate remote from said second beam splitting mirror, said second polarizer having its plane of polarization oriented to the plane of polarization of said first polarizer at an angle equal to a substantial integral multiple of 90 degrees, one of said multiples being even and the other odd.

22. A visual display system as in claim 21, wherein said optics further comprise:
   h) a first pair of plates positioned on either side of said first polarizer; and
   i) a second pair of end plates wherein one of said second pair of end plates is positioned on the side of said first quarter wave plate facing the concave side of said spherical mirror and the other is positioned on the side of said second polarizer remote from said second quarter wave plate
whereby said end plates have a broad band anti-reflection coating.

23. A visual display system for presenting a virtual image, as in claim 22, wherein said optics comprise a multi layer sandwich of optical elements including holographic optical elements.

24. A visual display system as in claim 21, further comprising:
   g) a diffusing screen disposed on the side of said first polarizer remote from said beam splitting spherical mirror at a distance from said second beam splitting mirror such that the virtual image of said screen in said second beam splitting mirror is adjacent to the focal surface of said first mirror.

* * * * *